(12) United States Patent
Seo et al.

(10) Patent No.: US 10,798,698 B2
(45) Date of Patent: Oct. 6, 2020

(54) METHOD FOR MITIGATING INTER CELL INTERFERENCE AND DEVICE THEREFOR

(71) Applicant: LG ELECTRONICS INC., Seoul (KR)

(72) Inventors: Hanbyul Seo, Anyang-si (KR); Seungmin Lee, Anyang-si (KR); Joonkui Ahn, Anyang-si (KR); Suckchel Yang, Anyang-si (KR); Inkwon Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/395,034

(22) Filed: Apr. 25, 2019

(65) Prior Publication Data

US 2019/0254012 A1 Aug. 15, 2019

Related U.S. Application Data

(63) Continuation of application No. 15/947,173, filed on Apr. 6, 2018, now Pat. No. 10,575,294, which is a
(Continued)

(51) Int. Cl.
*H04W 4/00* (2018.01)
*H04W 72/04* (2009.01)
(Continued)

(52) U.S. Cl.
CPC ....... *H04W 72/042* (2013.01); *H04J 11/0056* (2013.01); *H04L 5/001* (2013.01);
(Continued)

(58) Field of Classification Search
CPC .......... H04W 72/042; H04W 72/0413; H04W 72/0406; H04L 5/0048; H04L 5/0055
See application file for complete search history.

(56) References Cited

U.S. PATENT DOCUMENTS

| 2009/0046617 A1 | 2/2009 | Tenny et al. |
| 2009/0181689 A1 | 7/2009 | Lee ........................ H04L 1/1854 455/450 |

(Continued)

FOREIGN PATENT DOCUMENTS

| KR | 10-2010-0011879 A | 2/2010 |
| KR | 10-2010-0019957 A | 2/2010 |

(Continued)

OTHER PUBLICATIONS

Samsung, "Downlink Subframe Alignment in Type I Relay", R1-102216, 3GPP TSG RAN WG1 Meeting #60bis, Beijing, China, Apr. 12-16, 2010.
(Continued)

*Primary Examiner* — Atique Ahmed
(74) *Attorney, Agent, or Firm* — Dentons US LLP

(57) ABSTRACT

The present invention relates to a wireless communication system. More specifically, the present invention relates to a method and a device therefor, wherein the method comprises the steps of: receiving a PDCCH signal that contains scheduling information from a base station on a first subframe; receiving a PDSCH signal corresponding to said PDCCH signal from said base station on a second subframe; and decoding said PDSCH signal, wherein an interval between said first subframe and said second subframe is varied.

18 Claims, 12 Drawing Sheets

Related U.S. Application Data continuation of application No. 13/996,880, filed as application No. PCT/KR2011/009848 on Dec. 20, 2011, now Pat. No. 9,949,244.

(60) Provisional application No. 61/425,729, filed on Dec. 21, 2010.

(51) Int. Cl.
  *H04L 5/00* (2006.01)
  *H04L 5/14* (2006.01)
  *H04J 11/00* (2006.01)
  *H04L 27/26* (2006.01)

(52) U.S. Cl.
  CPC .......... *H04L 5/0035* (2013.01); *H04L 5/0055* (2013.01); *H04L 5/1469* (2013.01); *H04L 27/2647* (2013.01)

(56) References Cited

U.S. PATENT DOCUMENTS

| | | | |
|---|---|---|---|
| 2009/0196204 A1 | 8/2009 | Astely | H04L 1/1635 370/280 |
| 2010/0172290 A1 | 7/2010 | Nam et al. | |
| 2010/0195566 A1 | 8/2010 | Krishnamurthy | H04L 5/0007 370/328 |
| 2010/0195583 A1 | 8/2010 | Nory et al. | |
| 2010/0195586 A1 | 8/2010 | Choi et al. | |
| 2010/0232373 A1* | 9/2010 | Nory | H04W 72/1289 370/329 |
| 2010/0238845 A1* | 9/2010 | Love | H04W 72/1263 370/280 |
| 2010/0272048 A1 | 10/2010 | Pan | H04L 1/1635 370/329 |
| 2010/0279628 A1* | 11/2010 | Love | H04L 5/0091 455/70 |
| 2010/0303013 A1 | 12/2010 | Khandekar et al. | |
| 2011/0044239 A1* | 2/2011 | Cai | H04W 72/042 370/328 |
| 2011/0044261 A1 | 2/2011 | Cai | H04L 5/0053 370/329 |
| 2011/0064037 A1 | 3/2011 | Wei | H04W 72/1289 370/329 |
| 2011/0069637 A1* | 3/2011 | Liu | H04W 72/0426 370/254 |
| 2011/0085457 A1 | 4/2011 | Chen | H04L 1/1812 370/252 |
| 2011/0105050 A1 | 5/2011 | Khandekar | H04L 5/001 455/68 |
| 2011/0141985 A1 | 6/2011 | Larsson et al. | 370/329 |
| 2011/0170496 A1* | 7/2011 | Fong | H04W 52/24 370/329 |
| 2011/0205978 A1 | 8/2011 | Nory | H04L 5/0007 370/329 |
| 2011/0243066 A1 | 10/2011 | Nayeb Nazar et al. | 370/328 |
| 2011/0292900 A1 | 12/2011 | Ahn | H04L 1/1607 370/329 |
| 2012/0113831 A1* | 5/2012 | Pelletier | H04L 5/0058 370/252 |
| 2012/0113875 A1 | 5/2012 | Alanara et al. | 370/280 |

FOREIGN PATENT DOCUMENTS

| | | |
|---|---|---|
| KR | 1020100014118 A | 2/2010 |
| KR | 10-2010-0121434 A | 11/2010 |
| KR | 1020100124677 A | 11/2010 |
| WO | 2006/105005 A2 | 10/2006 |
| WO | 2010/018945 A2 | 2/2010 |

OTHER PUBLICATIONS

LG Electronics Inc., "PDSCH Starting Symbol Indication in Cross-Carrier Scheduling", R1-102364, TSG-RAN WG1 Meeting #60bis, Beijing, China, Apr. 12-16, 2010.

Motorola, "Heterogeneous Support for Reliable Downlink Control", R1-092640, 3GPP TSG RAN1 #57bis, Los Angeles, USA, Jun. 29-Jul. 3, 2009.

CATT, "Interference Measurement over Muted RE", 3GPP TSG RAN WG1 Meeting #63, R1-105922 Nov. 15-19, 2010.

Panasonic, "PDCCH interference Mitigation by Downlink Power Setting for Macro-Femto Scenario", 3GPP TSG RAN WG1 Meeting #63, R1-106090 Nov. 15-19, 2010.

LG Electronics, "Details of eICIC in Macro-Pico case", 3GPP TSG RAN WG1 Meeting #63, R1-106143, Nov. 15-19, 2010.

LG Electronics, "Impact of CRS interference", 3GPP TSG RAN WG1 Meeting #63, R1-106144, Nov. 15-19, 2010.

\* cited by examiner

FIG. 2a
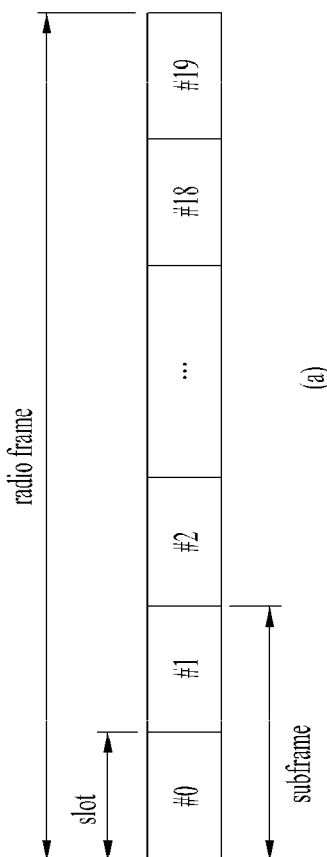
(a)
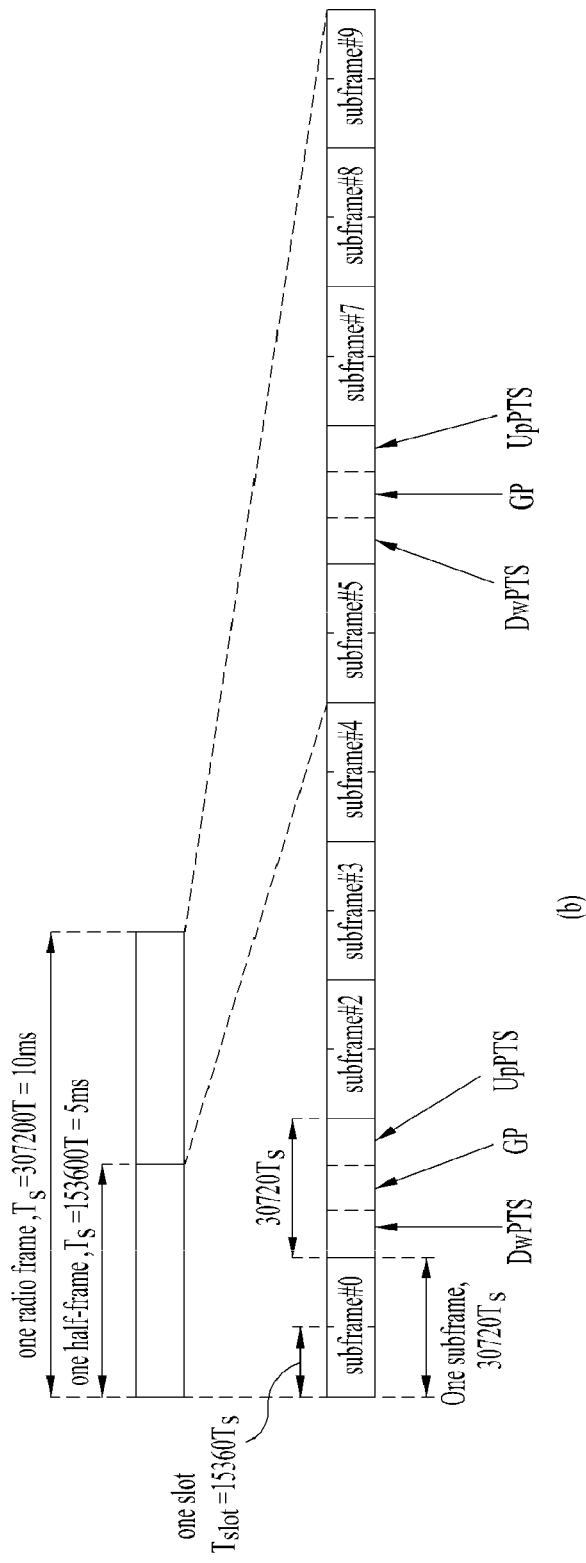
(b)

METHOD FOR MITIGATING INTER CELL INTERFERENCE AND DEVICE THEREFOR

This application is a continuation of U.S. application Ser. No. 14/947,173 filed on Apr. 6, 2018, which is a continuation of U.S. application Ser. No. 13/996,880 filed on Jun. 21, 2013, now U.S. Pat. No. 9,949,244, which is a 371 national stage entry of International Application No. PCT/KR2011/09848 filed on Dec. 20, 2011, and claims the benefit of U.S. Provisional Application No. 61/425,729 filed on Dec. 21, 2010, all of which are incorporated by reference in their entirety herein.

TECHNICAL FIELD

The present invention relates to a wireless communication system, and more particularly, to a method for mitigating inter cell interference and a device therefor.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present invention devised to solve the conventional problem is to provide a method for efficiently mitigating inter cell interference in a wireless communication system and a device therefor. Another object of the present invention is to provide a method for scheduling for mitigation of inter cell interference and a device therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method for receiving a downlink signal in a user equipment of a wireless communication system comprises the steps of receiving a physical downlink control channel (PDCCH) signal, which includes scheduling information, from a base station on a first subframe; receiving a physical downlink shared channel (PDSCH) signal corresponding to the PDCCH signal from the base station on a second subframe; and decoding the PDSCH signal, wherein an interval between the first subframe and the second subframe is varied.

In another aspect of the present invention, a user equipment for use in a wireless communication system comprises a radio frequency (RF) unit; and a processor, wherein the processor is configured to receive a physical downlink control channel (PDCCH) signal, which includes scheduling information, from a base station on a first subframe, receive a physical downlink shared channel (PDSCH) signal corresponding to the PDCCH signal from the base station on a second subframe, and decode the PDSCH signal, and an interval between the first subframe and the second subframe is varied.

Preferably, the interval between the first subframe and the second subframe is varied by predetermined information within the PDCCH signal.

Preferably, the interval between the first subframe and the second subframe is varied by considering at least one of carrier configuration for the user equipment and a value of a carrier indication field within the PDCCH signal.

Preferably, if a single carrier is configured for the user equipment, the value of the carrier indication field is used to indicate the second subframe, if a multi-carrier is configured for the user equipment, the value of the carrier indication field is used to indicate a carrier to which the PDSCH signal is transmitted, and the first subframe and the second subframe are given equally.

Preferably, if a single carrier is configured for the user equipment, the value of the carrier indication field is used to indicate the second subframe, and if a multi-carrier is configured for the user equipment, the value of the carrier indication field is used to indicate combination of the carrier to which the PDSCH signal is transmitted and the second subframe.

Preferably, the processor is further configured to transmit a physical uplink control channel (PUCCH) signal, which includes reception acknowledgement information for the PDSCH signal, on a third subframe, a resource for the PUCCH signal is inferred from a resource used to transmit the PDCCH, and an index of the third subframe is inferred from that of the second subframe used to transmit the PDSCH signal.

Preferably, the processor is further configured to transmit a PUCCH signal, which includes reception acknowledgement information for the PDSCH signal, on a third subframe, and transmission of the PUCCH signal is dropped on the third subframe if an interval between the second subframe and the third subframe is smaller than a predetermined value.

Advantageous Effects

According to the present invention, inter cell interference may efficiently be mitigated in the wireless communication system. Also, the present invention may provide scheduling for mitigation of inter cell interference.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2A is a diagram illustrating a structure of a radio frame;

BEST MODE FOR CARRYING OUT THE INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, the following embodiments will be described based on that technical features of the present invention are applied to the 3GPP LTE/LTE-A. However, it is to be understood that the technical spirits of the present invention are not limited to the 3GPP LTE/LTE-A. Also, specific terminologies used hereinafter are provided to assist understanding of the present invention, and various modifications may be made in the specific terminologies within the range that does not depart from the technical spirits of the present invention.

In a wireless communication system, a user equipment may receive information from a base station through a downlink (DL), and may also transmit information to the base station through an uplink (UL). Examples of information transmitted from and received between the user equipment and the base station include data and various kinds of control information. Various physical channels exist depending on types and usage of information transmitted from or received between the user equipment and the base station.

Figure 1:
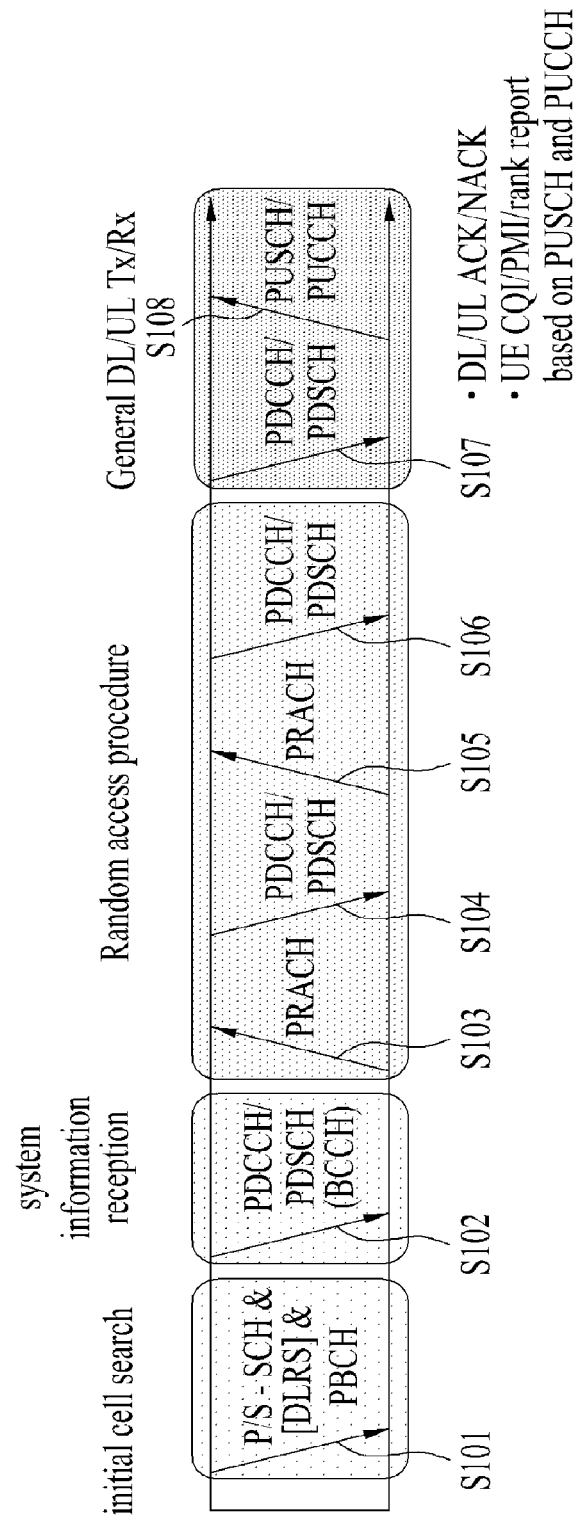
FIG. 1 is a diagram illustrating physical channels used in a $3^{rd}$ generation partnership project long term evolution (3GPP LTE) system, which is an example of a wireless communication system, and a general method for transmitting a signal using the physical channels.

FIG. 1 is a diagram illustrating physical channels used in a $3^{rd}$ generation partnership project long term evolution (3GPP LTE) system, which is an example of a mobile communication system, and a general method for transmitting a signal using the physical channels.

A user equipment performs initial cell search such as synchronizing with a base station when it newly enters a cell or the power is turned on, at step S101. To this end, the user equipment may synchronize with the base station by receiving a primary synchronization channel (P-SCH) and a secondary synchronization channel (S-SCH) from the base station, and may acquire information of cell ID, etc. Afterwards, the user equipment may acquire broadcast information within a cell by receiving a physical broadcast channel from the base station. Meanwhile, the user equipment may identify the channel status of a downlink by receiving a downlink reference signal (DL RS) in the initial cell search step.

The user equipment which has finished the initial cell search may acquire more detailed system information by receiving a physical downlink control channel (PDCCH) and a physical downlink control channel (PDSCH) based on the physical downlink control channel information, at step S102.

Afterwards, the user equipment may perform a random access procedure (RACH) for the base station, such as step S103 to S106, to completely access the base station. To this end, the user equipment may transmit a preamble through a random physical random access channel (PRACH) (S103), and may receive a response message to the preamble through the PDCCH and a PDSCH corresponding to the PDCCH (S104). In case of contention based random access, a contention resolution procedure such as transmission (S105) of additional PRACH and reception (S106) of the PDCCH and the PDSCH corresponding to the PDCCH may be performed.

The user equipment which has performed the aforementioned steps may receive the PDCCH/PDSCH (S107) and transmit a physical uplink shared channel (PUSCH) and a physical uplink control channel (PUCCH) (S108), as a general procedure of transmitting uplink/downlink signals. The control information transmitted from the user equipment to the base station will be referred to as uplink control information (UCI). The UCI includes hybrid automatic repeat and request acknowledgement/negative acknowledgement (HARQ ACK/NACK), a scheduling request (SR), channel state information (CSI), etc. In this specification, the HARQ ACK/NACK will simply be referred to as HARQ-ACK or ACK/NACK(A/N). HARQ-ACK includes at least one of positive ACK (simply, ACK), negative ACK (NACK), discontinuous transmission (DTX) and NACK/

DTX. CSI includes a CQI (Channel Quality Indicator), a PMI (Precoding Matrix Indicator), RI (Rank Indication), etc. Although the UCI is transmitted through the PUCCH, it may be transmitted through the PUSCH if control information and traffic data should be transmitted at the same time. Also, the user equipment may non-periodically transmit the UCI through the PUSCH in accordance with request/command of the network.

FIG. 2A is a diagram illustrating a structure of a radio frame. In a cellular OFDM wireless packet communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 2A(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in time domain and a plurality of resource blocks (RB) in frequency domain. Since OFDMA is used on a downlink in the 3GPP LTE system, OFDM symbols represent one symbol interval. The OFDM symbols may be referred to as SC-FDMA symbols or symbol interval. The resource block as resource allocation unit may include a plurality of continuous subcarriers in one slot.

The number of OFDM symbols included in one slot may be varied depending on configuration of cyclic prefix (CP). Examples of the CP include extended CP and normal CP. For example, if the OFDM symbols are configured by normal CP, the number of OFDM symbols included in one slot may be 7. If the OFDM symbols are configured by extended CP, since the length of one OFDM symbol is increased, the number of OFDM symbols included in one slot is smaller than that of OFDM symbols in case of normal CP. In case of the extended CP, the number of OFDM symbols included in one slot may be 6. If a channel status is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

FIG. 2A(b) is a diagram illustrating a structure of a type 2 radio frame. The type 2 radio frame includes two half frames, each of which includes four normal subframes and a special subframe. The special subframe includes a downlink pilot time slot (DwPTS), a guard period (GP), and an uplink pilot time slot (UpPTS). Each subframe includes two slots. In the special subframe, DwPTS is used for initial cell search, synchronization or channel estimation at the user equipment. UpPTS is used to synchronize channel estimation at the base station with uplink transmission of the user equipment. Also, the guard period is to remove interference occurring in the uplink due to multipath delay of downlink signals between the uplink and the downlink.

The aforementioned structure of the radio frame is only exemplary, and various modifications may be made in the number of subframes included in the radio frame, the number of slots included in the subframe, or the number of symbols included in the slot.

Figure 2B:
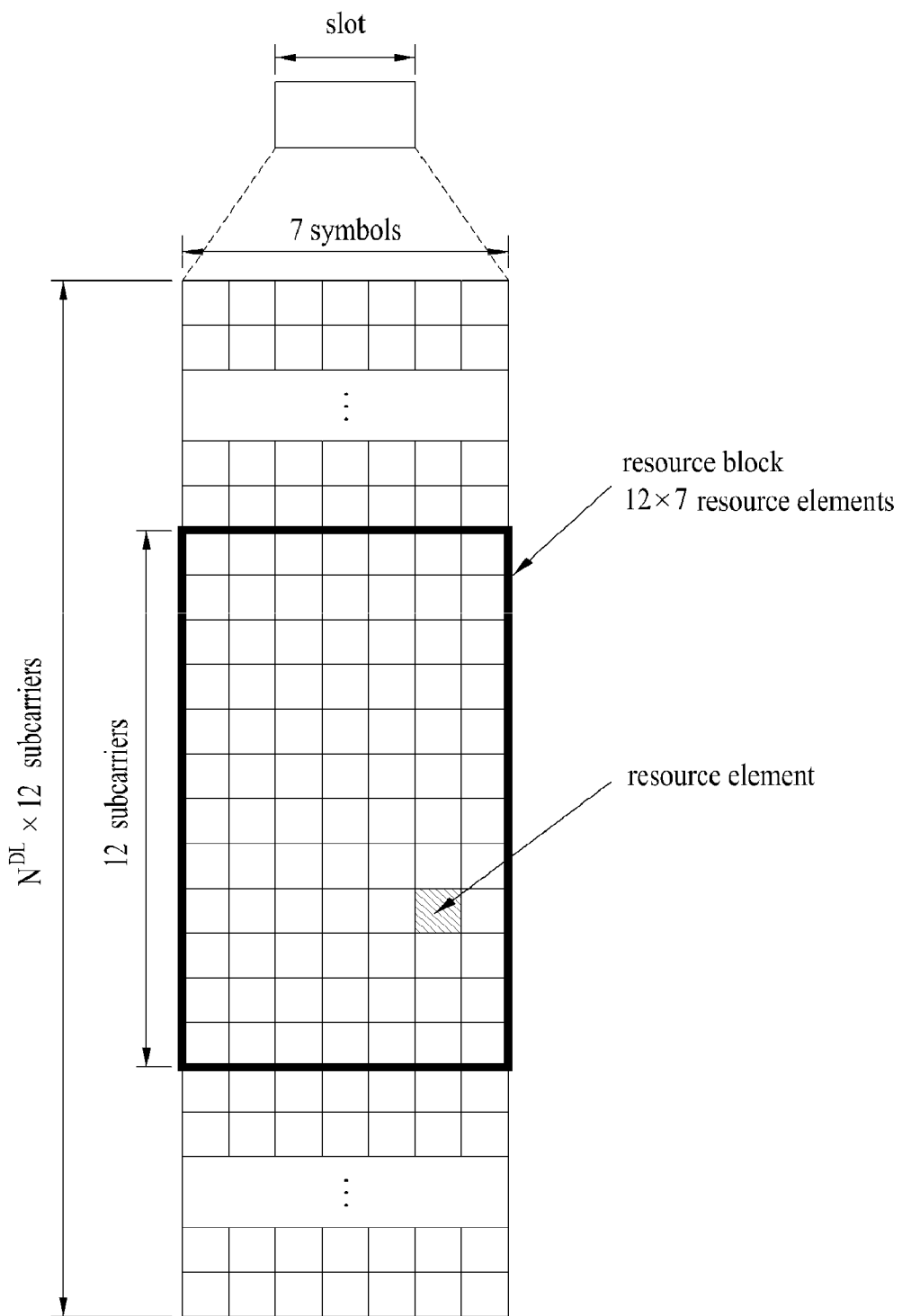
FIG. 2B is a diagram illustrating a resource grid of a downlink slot.

FIG. 2B is a diagram illustrating a resource grid of a downlink slot.

Referring to FIG. 2B, the downlink slot includes a plurality of OFDM symbols in a time region. One downlink slot includes 7(6) OFDM symbols, and a resource block includes 12 subcarriers in a frequency domain. Each element on the resource grid will be referred to as a resource element (RE). One resource block (RB) includes 12×7(6) resource elements. The number $N_{RB}$ of resource blocks (RBs) included in the downlink slot depends on a downlink transmission bandwidth. A structure of an uplink slot is the same as that of the downlink slot except that OFDM symbols are replaced with SC-FDMA symbols.

Figure 3:
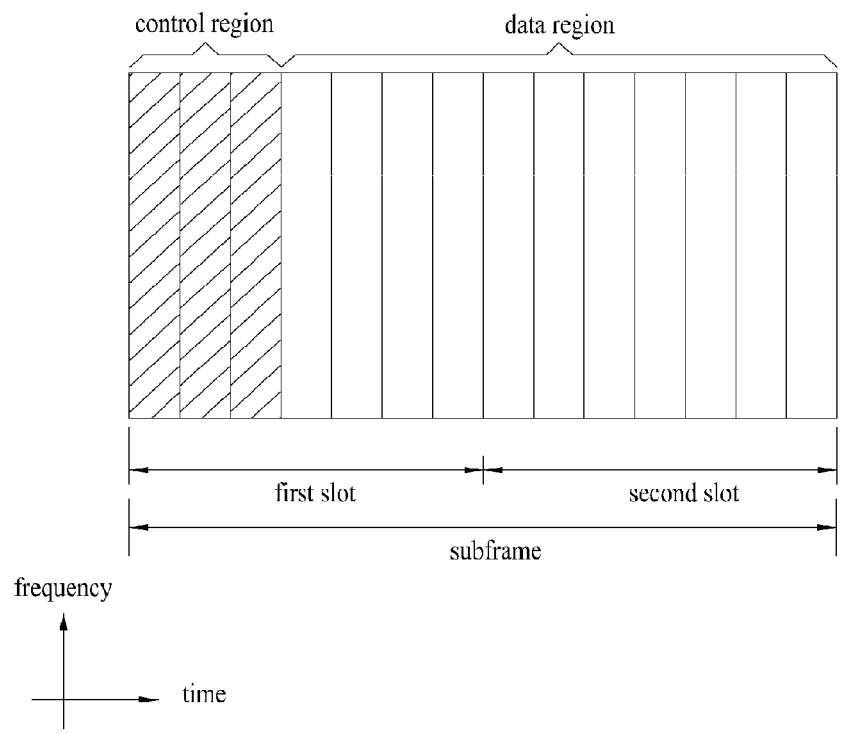
FIG. 3 is a diagram illustrating a structure of a downlink frame.

FIG. 3 is a diagram illustrating a structure of a downlink subframe.

Referring to FIG. 3, maximum 3(4) OFDM symbols located at the front of the first slot of the subframe correspond to a control region to which a control channel is allocated. The other OFDM symbols correspond to a data region to which a physical downlink shared channel (PDSCH) is allocated. Examples of the downlink control channel used in the LTE include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and carries information on the number of OFDM symbols used for transmission of the control channel within the subframe. The PHICH carries HARQ ACK/NACK (acknowledgement/negative-acknowledgement) in response to uplink transmission.

The control information transmitted through the PDCCH will be referred to as downlink control information (DCI). The DCI includes resource allocation information for a user equipment or user equipment group and other control information. For example, the DCI includes uplink/downlink scheduling information, uplink transmission (Tx) power control command, etc.

The PDCCH carries transport format and resource allocation information of a downlink shared channel (DL-SCH), transport format and resource allocation information of an uplink shared channel (UL-SCH), paging information on a paging channel (PCH), system information on the DL-SCH, resource allocation information of higher layer control message such as random access response transmitted on the PDSCH, a set of transmission power control commands of individual user equipments (UEs) within a user equipment group, a transmission power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). The format of the PDCCH and the number of bits of the PDCCH are determined depending on the number of CCEs. The base station determines a PDCCH format depending on the DCI to be transmitted to the user equipment, and attaches cyclic redundancy check (CRC) to the control information. The CRC is masked (or scrambled) with an identifier (for example, radio network temporary identifier (RNTI)) depending on usage of the PDCCH or owner of the PDCCH. For example, if the PDCCH is for a specific user equipment, an identifier (for example, cell-RNTI (C-RNTI)) of the corresponding user equipment may be masked with the CRC. If the PDCCH is for a paging message, a paging identifier (for example, Paging-RNTI (P-RNTI)) may be masked with the CRC. If the PDCCH is for system information (in more detail, system information block (SIB)), system information RNTI (SI-RNTI) may be masked with the CRC. If the PDCCH is for a random access response, a random access RNTI (RA-RNTI) may be masked with the CRC.

Figure 4:
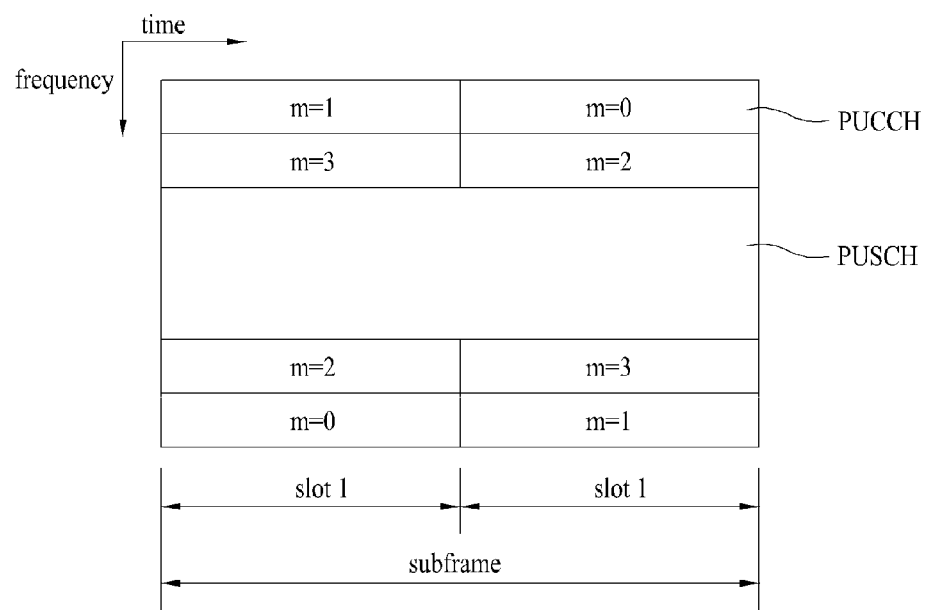
FIG. 4 is a diagram illustrating a structure of an uplink subframe.

FIG. 4 is a diagram illustrating a structure of an uplink subframe in an LTE system.

Referring to FIG. 4, the uplink subframe includes a plurality of slots (for example, two). Each slot may include a plurality of SC-FDMA symbols, wherein the number of SC-FDMA symbols included in each slot is varied depending on a cyclic prefix (CP) length. The uplink subframe is divided into a data region and a control region in a frequency domain. The data region includes a PUSCH, and is used to transmit a data signal such as voice. The control region includes a PUCCH, and is used to transmit uplink control information (UCI). The PUCCH includes RB pair located at both ends of the data region on a frequency axis, and performs hopping on the border of the slots.

The PUCCH may be used to transmit the following control information.

- SR (Scheduling Request): is information used to request uplink UL-SCH resource. The SR is transmitted using an on-off keying (OOK) system.
- HARQ ACK/NACK: is a response signal to a downlink data packet on the PDSCH. It represents whether the downlink data packet has been successfully received. ACK/NACK 1 bit is transmitted in response to a single downlink codeword, and ACK/NACK 2 bits are transmitted in response to two downlink codewords.
- CSI (Channel State Information): is feedback information on a downlink channel. The CSI includes channel quality indicator (CQI), and MIMO (Multiple Input Multiple Output) related feedback information includes a rank indicator (RI) and a precoding matrix indicator (PMI). 20 bits are used per subframe.

The quantity of the uplink control information (UCI) that may be transmitted from the user equipment for the subframe depends on the number of SC-FDMA symbols available for control information transmission. The SC-FDMA symbols available for control information transmission mean the remaining SC-FDMA symbols except for SC-FDMA symbols for reference signal transmission for the subframe, and the last SC-FDMA symbol of the subframe is excluded in case of the subframe for which a sounding reference signal (SRS) is set. The reference signal is used for coherent detection of the PUCCH. The PUCCH supports seven formats in accordance with information which is transmitted.

Table 1 illustrates a mapping relation between the PUCCH format and the UCI in the LTE system.

TABLE 1

| PUCCH Format | Uplink Control Information (UCI) |
| --- | --- |
| Format 1 | Scheduling request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |

TABLE 1-continued

| PUCCH Format | Uplink Control Information (UCI) |
| --- | --- |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

Figure 5:
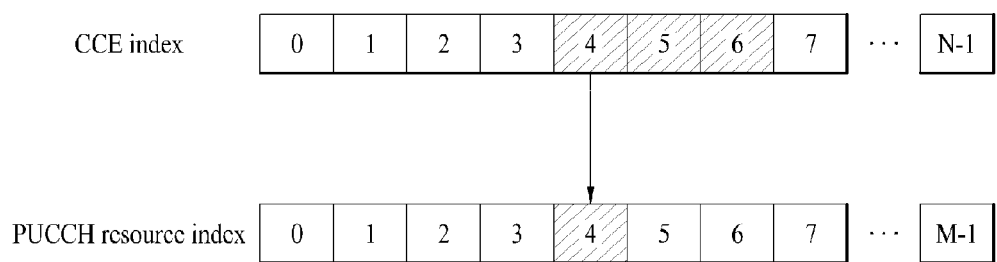
FIG. 5 is a diagram illustrating an example of determination of PUCCH resources for acknowledgement (ACK)/negative ACK (NACK)

FIG. 5 is a diagram illustrating an example of determining PUCCH resources for ACK/NACK. In the LTE system, PUCCH resources for ACK/NACK are not previously allocated to each user equipment but used per timing point by a plurality of user equipments within a cell. In more detail, the PUCCH resources used for ACK/NACK transmission by the user equipment correspond to PDCCH carrying scheduling information of corresponding downlink data. In each downlink subframe, an entire region where the PDCCH is transmitted includes a plurality of control channel elements (CCEs), and the PDCCH transmitted to the user equipment includes one or more CCEs. The user equipment transmits ACK/NACK through a PUCCH resource corresponding to a specific CCE (for example, first CCE) among CCEs constituting PDCCH received therein.

Referring to FIG. 5, it is assumed that PDSCH information is transferred through a PDCCH that includes CCEs Nos. 4 to 6. In this case, the user equipment transmits ACK/NACK through PUCCH No. 4 corresponding to CCE No. 4 which is the first CCE of the PDCCH. FIG. 5 illustrates that maximum M number of PUCCHs exist in the uplink (UL) when maximum N number of CCEs exist in the downlink (DL).

In more detail, in the LTE system, the PUCCH resource index is defined as follows.

$$n^{(1)}_{PUCCH} = n_{CCE} + N^{(1)}_{PUCCH} \quad [\text{Equation 1}]$$

In this case, $n^{(1)}_{PUCCH}$ represents a PUCCH resource index for transmitting ACK/NACK, $N^{(1)}_{PUCCH}$ represents a signaling value transferred from an higher layer, and $n_{CCE}$ represents the smallest value of CCE indexes used for PDCCH transmission. A cyclic shift for PUCCH formats 1a/1b, an orthogonal spreading code and a physical resource block (PRB) are obtained from $n^{(1)}_{PUCCH}$.

Figure 6:
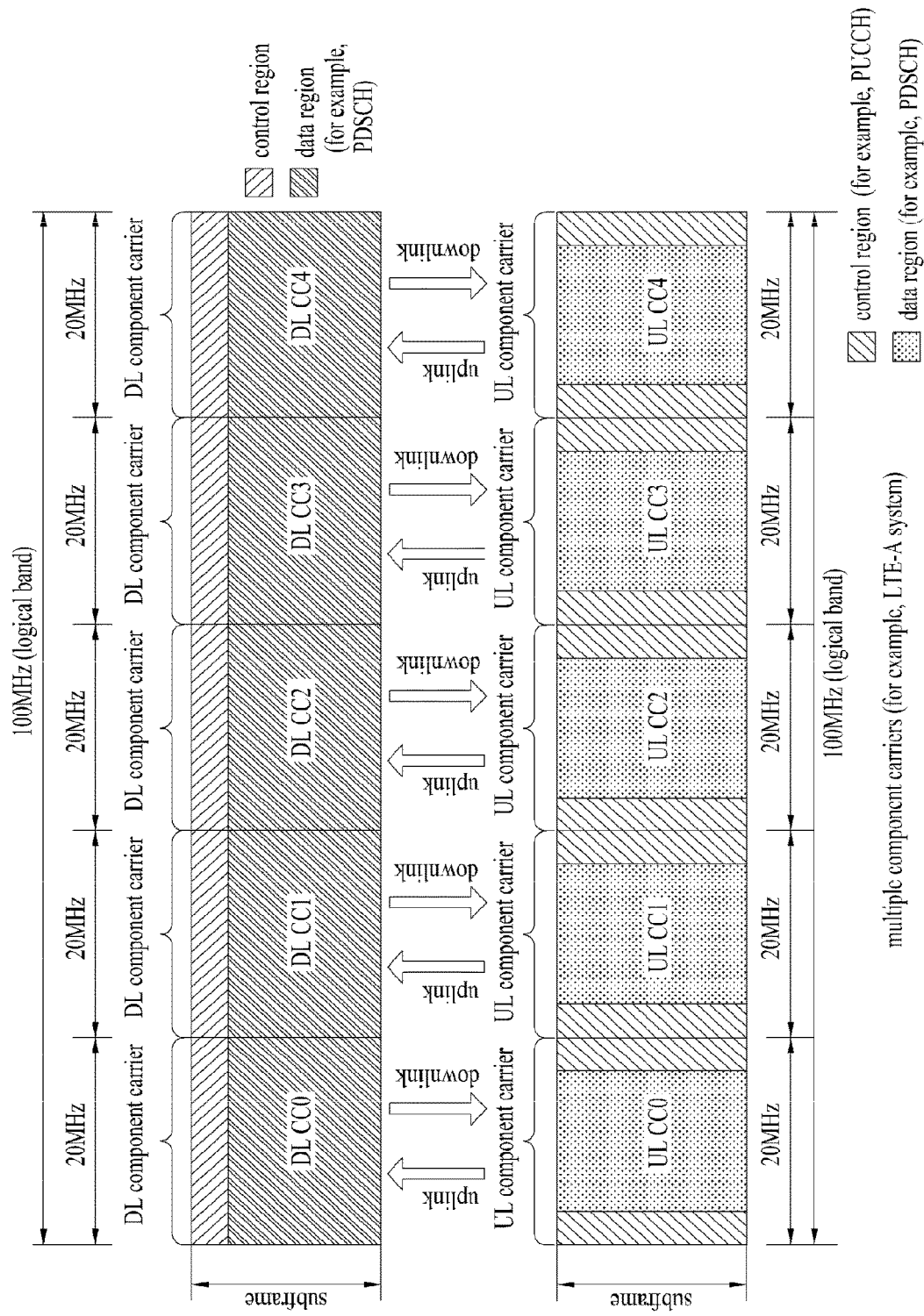
FIG. 6 is a diagram illustrating a carrier aggregation (CA) communication system.

FIG. 6 is a diagram illustrating a carrier aggregation (CA) communication system. The LTE-A system uses the carrier aggregation technology or the bandwidth aggregation technology, which uses wider uplink/downlink bandwidth through a plurality of uplink/downlink frequency blocks, to use wider frequency bandwidth. Each frequency block is transmitted using a component carrier (CC). The component carrier may be understood as carrier frequency (or center carrier or center frequency) for a corresponding frequency block.

Referring to FIG. 6, a plurality of uplink/downlink component carriers (CC) may be collected to support wider uplink/downlink bandwidth. The respective CCs may adjoin each other or not in the frequency domain. A bandwidth of each component carrier may be defined independently. Asymmetric carrier aggregation where the number of UL CCs is different from the number of DL CCs may be performed. For example, if the number of DL CCs is 2 and the number of UL CCs is 1, carrier aggregation may be configured to correspond to 2:1. DL CC/UL CC links may be fixed to the system or may be configured semi-statically. Also, even though a system full band includes N number of CCs, a frequency band that may be monitored and received by a specific user equipment may be limited to M(<N)

number of CCs. Various parameters for carrier aggregation may be configured cell-specifically, user equipment group-specifically, or user equipment-specifically. Meanwhile, the control information may be set to be transmitted and received through a specific CC only. This specific CC may be referred to as a primary CC (PCC) (or anchor CC), and the other CCs may be referred to as secondary CCs (SCC).

The LTE-A system uses a concept of cell to manage radio resources. The cell is defined by combination of downlink resources and uplink resources, wherein the uplink resources may be defined selectively. Accordingly, the cell may be configured by downlink resources only, or may be configured by downlink resources and uplink resources. If carrier aggregation is supported, linkage between carrier frequency (or DL CC) of the downlink resources and carrier frequency (or UL CC) of the uplink resources may be indicated by system information. The cell operated on the primary frequency (or PCC) may be referred to as a primary cell (PCell), and the cell operated on the secondary frequency (or SCC) may be referred to as a primary cell (PCell). The PCell is used such that the user equipment performs an initial connection establishment procedure or connection re-establishment procedure. The PCell may refer to a cell indicated during a handover procedure. The SCell may be configured after RRC connection is established, and may be used to provide an additional radio resource. The PCell and the SCell may be referred to as serving cells. Although the user equipment is in RRC-CONNECTED state, if it is not set by carrier aggregation or does not support carrier aggregation, a single serving cell configured by the P cell only exists. On the other hand, if the user equipment is in the RRC-CONNECTED state and is set by carrier aggregation, one or more serving cells may exist, wherein the serving cells may include the PCell and full SCells. After an initial security activity procedure starts, for the user equipment supporting carrier aggregation, the network may configure one or more SCells in addition to the PCell initially configured during a connection establishment procedure.

If cross-carrier scheduling (or cross-CC scheduling) is used, the PDCCH for downlink allocation is transmitted to DL CC #0, and the corresponding PDSCH may be transmitted to DL CC #2. For cross-carrier scheduling, introduction of a carrier indicator field (CIF) may be considered. The presence of CIF within the PDCCH may be configured by higher layer signaling (for example, RRC signaling) semi-statically and user equipment-specifically (or user equipment group-specifically). The base line of PDCCH transmission will be summed up as follows.

CIF disabled: the PDCCH on the DL CC allocates PDSCH resource on the same DL CC or PUSCH resource on one linked UL CC.

CIF enabled: the PDCCH on the DL CC may allocate PDSCH or PUSCH resource on a specific DL/UL CC among a plurality of aggregated DL/UL CCs by using the CIF.

If the CIF exists, the base station may allocate a PDCCH monitoring DL cell set to reduce load of blind decoding (BD) in view of the user equipment. The PDCCH monitoring DL cell set includes one or more DL CCs as a part of the aggregated DL CCs, and the user equipment detects and decodes the PDCCH on the corresponding DL CC only. In other words, if the base station schedules the PDSCH/PUSCH to the user equipment, the PDCCH is transmitted through the PDCCH monitoring DL CC set only. The PDCCH monitoring DL CC set may be configured user equipment-specifically, user equipment group-specifically or cell-specifically. The terms "PDCCH monitoring DL CC" may be replaced with the equivalent terms such as monitoring carrier and monitoring cell. Also, CC aggregated for the user equipment may be replaced with the equivalent terms such as serving CC, serving carrier, and serving cell.

Figure 7:
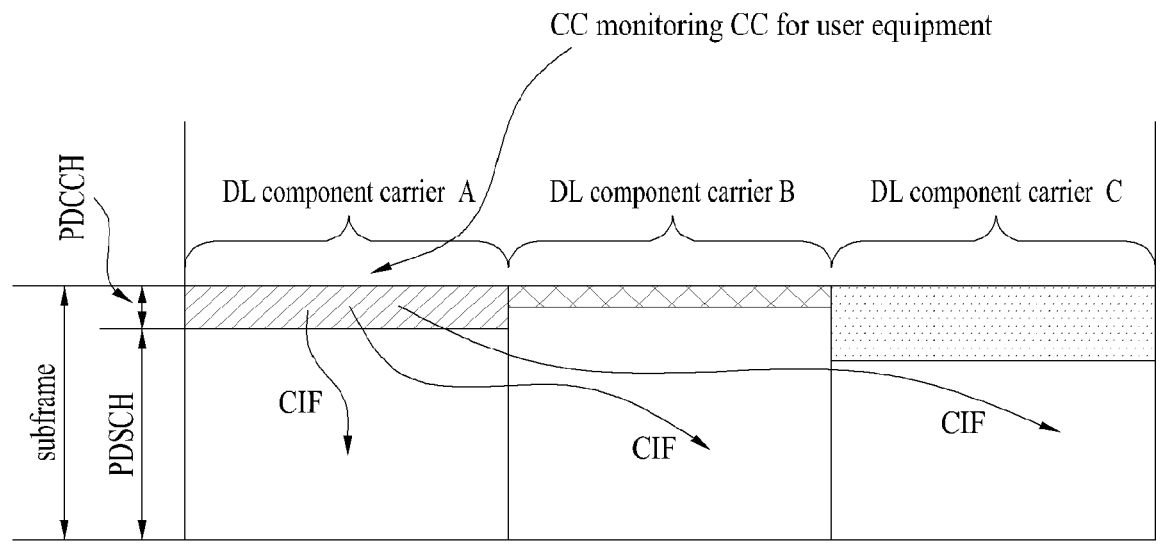
FIG. 7 is a diagram illustrating an example of cross-carrier scheduling.

FIG. 7 is a diagram illustrating scheduling when a plurality of carriers are aggregated. It is assumed that three DL cells are aggregated. It is also assumed that DL CC A is set to a PDCCH monitoring DL CC. DL CC A to DL CC C may be referred to as serving CCs, serving carriers, serving cells, etc. If the CIF is disabled, each DL CC may transmit the PDCCH only that schedules PDSCH of the DL CC without CIF in accordance with the LTE PDCCH rule. On the other hand, if the CIF is enabled by user equipment-specific (or user equipment group-specific or cell-specific) higher layer signaling, the DL CC A (monitoring DL CC) may transmit the PDCCH, which schedules the PDSCH of another CC, as well as the PDCCH, which schedules the PDSCH of the DL CC A. In this case, the PDCCH is not transmitted from the DL CC B/C which is not set to the PDCCH monitoring DL CC.

In the meantime, it is expected that the LTE-A system, which is the standard of the next generation wireless communication system, will support a coordinated multi point (CoMP) transmission system, which has not been supported by the existing standard, so as to improve a data transmission rate. In this case, the CoMP transmission system means that two or more base stations or cells perform communication with a user equipment by coordinating with each other to improve communication throughput between the base station (cell or sector) and the user equipment located in a shaded zone.

Examples of the CoMP system may include a coordinated MIMO type joint processing (CoMP-JP) system through data sharing and a CoMP-coordinated scheduling/beamforming (CoMP-CS/CB) system.

In case of the down link, according to the joint processing (CoMP-JP) system, the user equipment may simultaneously receive data from each base station that performs CoMP transmission system, and may improve receiving throughput by combining the signals received from each base station (joint transmission; JT). Also, there may be considered a method (dynamic point selection, DPS) for transmitting data from one of base stations, which perform the CoMP transmission system, to the user equipment at a specific time. According to the coordinated scheduling/beamforming (CoMP-CS/CB) system, the user equipment may momentarily receive data from one base station, that is, serving base station, through beamforming.

Figure 8:
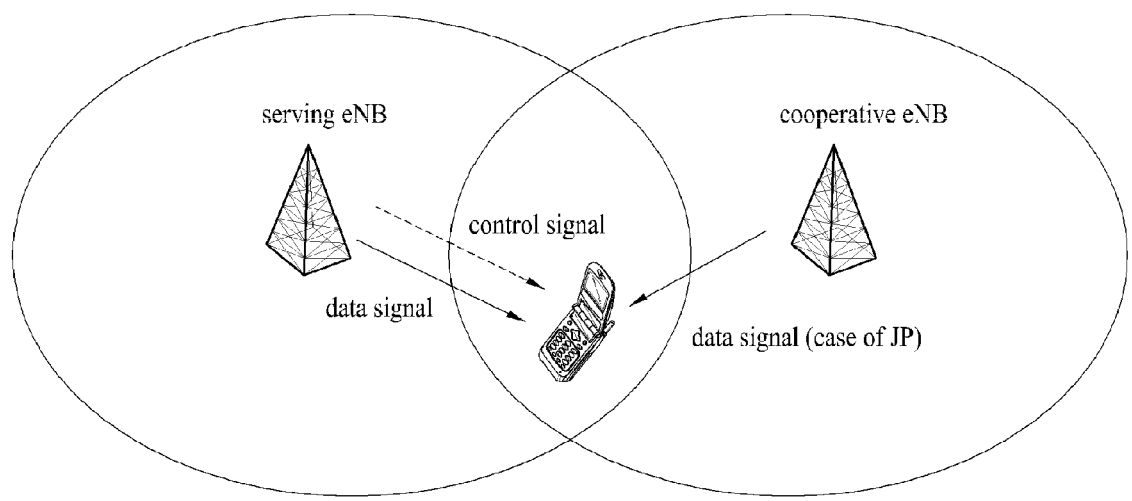
FIG. 8 is a diagram illustrating a coordinated multi point (CoMP) transmission system.

FIG. 8 is a diagram illustrating a coordinated multi point (CoMP) transmission system. In FIG. 8, it is assumed that the user equipment, that is, CoMP user equipment is operated by receiving control information from the serving base station (serving eNB, s-eNB). Also, in FIG. 8, it is assumed that data information is simultaneously transmitted from the s-eNB and a cooperative base station (eNB or c-eNB) in accordance with the CoMP JP scheme. If the CoMP CS/CB scheme is used, the data information is transmitted from the s-eNB only. In case of the DPS, the data information is transmitted from the base station only selected dynamically within the cooperative set that includes s-eNB and one or more c-eNBs. In the CoMP transmission system, the base station may be replaced with the terms such as cell and point.

Although FIG. 8 illustrates only one c-eNB, the present invention may generally be applied to the cooperative cell set where a plurality of c-eNBs exist. Also, the present invention may be applied to an inter-site CoMP structure that s-eNB and c-eNB are locally spaced apart from each other as shown in FIG. 8, an intra-site CoMP structure that eNBs existing within the cooperative cell set are co-located, or a heterogeneous network structure that is a combination type of the inter-site CoMP structure and the intra-site CoMP structure.

For the aforementioned CoMP transmission, higher CSI exactness will be required. For example, in case of the CoMP JT system, since several base stations transmit same data to a specific user equipment in cooperation with one another, the CoMP JT system may be regarded as a MIMO system that antennas are distributed geographically. Accordingly, in case of MU-MIMO based on the JT, CSI exactness of high level will be required in the same manner as single cell MU-MIMO. Also, in case of the CoMP CB system, elaborate CSI will be required to avoid interference of a neighboring cell to a serving cell.

An CoMP operation which mitigates inter cell interference is more effective in a dominant environment where an interference cell, which causes stronger interference than that of the serving cell, exists. This is because that dominant interference may effectively be mitigated through a proper CoMP operation.

Figure 9:
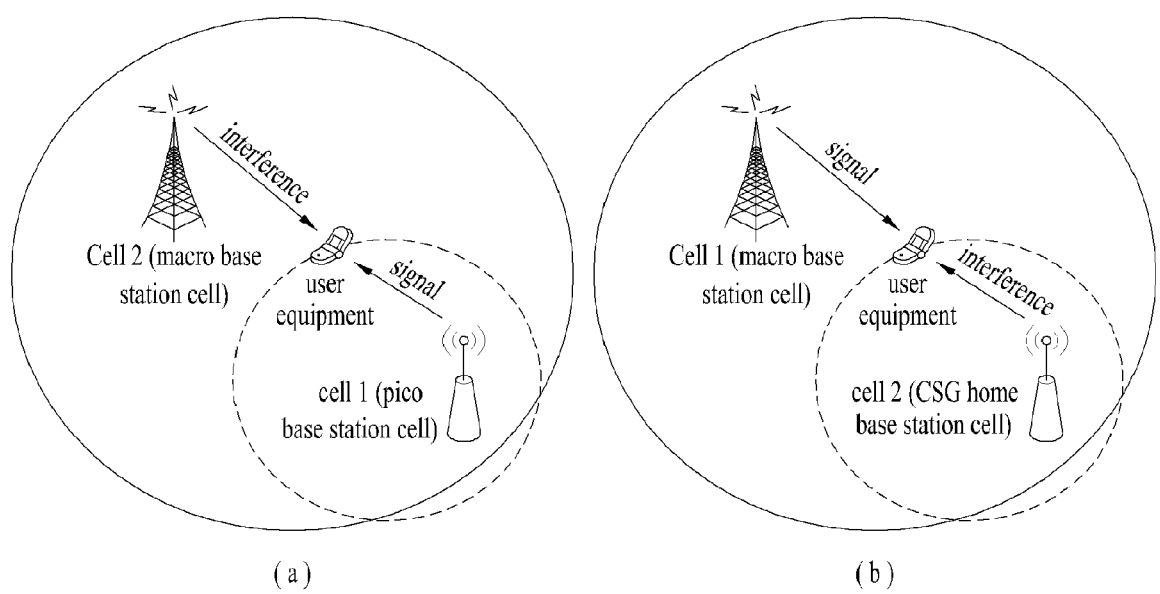
FIG. 9 is a diagram illustrating an example of a dominant interference environment.

FIG. 9 is a diagram illustrating an example of a dominant interference environment.

In FIG. 9(a), although the user equipment receives a stronger signal from a cell 2, the cell 2 connects the corresponding user equipment to a cell 1 where a weaker signal is received, to obtain off loading effect. This operation may be performed in such a manner that handover bias to the cell 1 is set at a proper level to allow a final handover reference value with bias to be greater than the cell 2 although a signal of the cell 1 is lower than that of the cell 2. In this case, if the cell 1 is a pico cell, it is especially useful in that load of the cell 2, which is a macro cell that should provide services to many user equipments, may be reduced. In FIG. 9(b), although the user equipment receives a stronger signal from the cell 2, the cell 2 is a closed subscriber group (CSG) cell that cannot be accessed by the user equipment. In this case, even though the signal of the cell 2 is strong, since the corresponding user equipment is not permitted to access the cell 2, it should be connected with the cell 1, which is one of the other cells, to perform communication.

Figure 10:
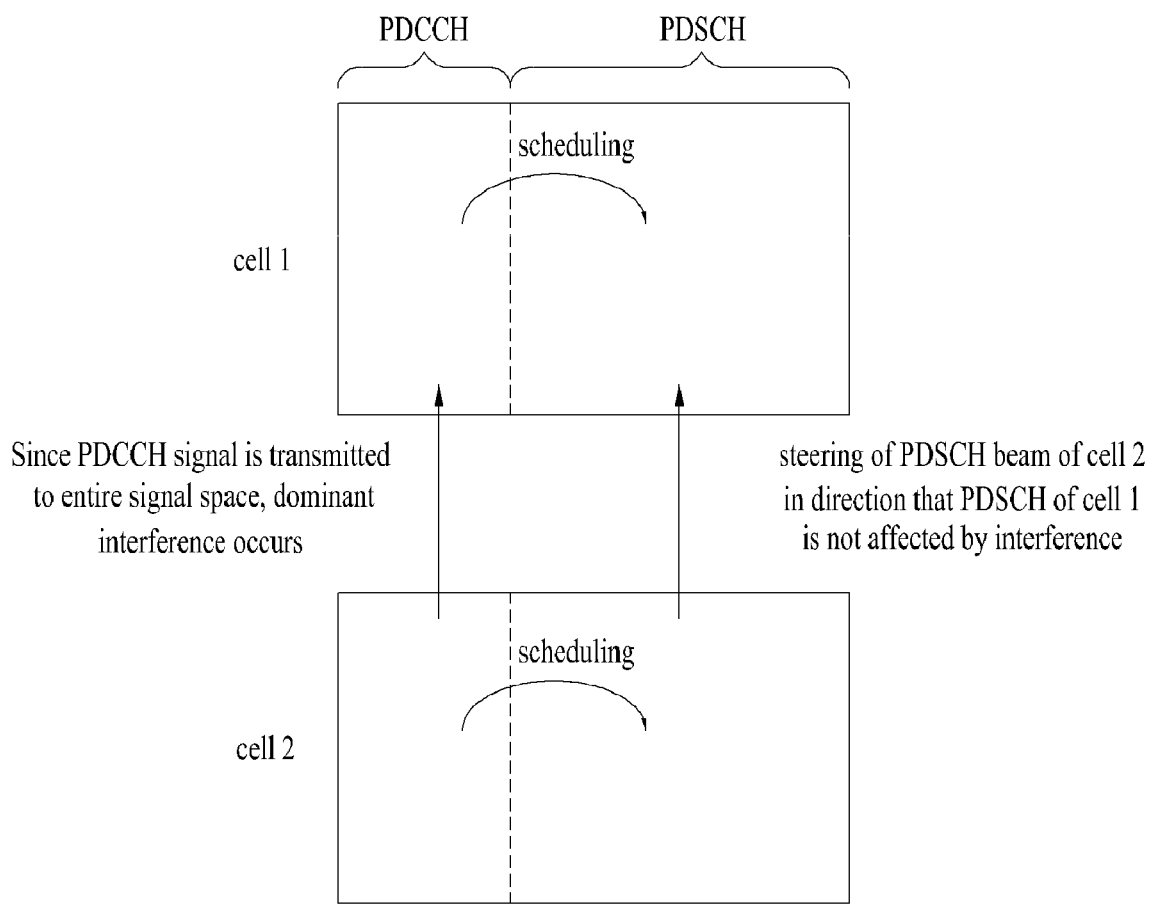
FIG. 10 is a diagram illustrating an example of inter cell interference based on a physical channel in a dominant interference environment.

FIG. 10 is a diagram illustrating an example of inter cell interference based on a physical channel in a dominant interference environment.

Referring to FIG. 10, in case of a downlink data channel, CoMP coordinated beamforming (CB) operation may be effective to solve inter cell interference. Through CB operation, an interference cell may perform beamforming in a specific direction that may minimize interference on a victim user equipment (UE), whereby the victim user equipment may be affected at a very low level by interference from a data channel of the interference cell. However, in case of the downlink control channel, it is general that transmission diversity is used to enable stable transmission and reception even without channel information. For this reason, it is difficult to apply the CB operation to the downlink control channel. If transmission diversity is used, the cell transmits its control channel through beams formed uniformly in all directions on a spatial domain, whereby the cell cannot transmit a signal in only the specific direction that may minimize interference on the victim user equipment. Accordingly, although the data channel (for example, PDSCH) of the interference cell for a specific subframe may maintain interference on the victim user equipment at a low level through CB, a control channel (for example, PDCCH) of the interference cell, which transfers information for scheduling the PDSCH of the interference cell, may cause high interference to the victim user equipment. As a result, for the corresponding subframe, the victim user equipment may receive the PDSCH of the serving cell as interference from the PDSCH of the interference cell is low, but fails to receive the PDCCH of the serving cell due to strong interference from the PDCCH of the interference cell. For this reason, a problem may occur in that the victim user equipment may not receive even the PDSCH of the serving cell.

Hereinafter, solutions for the aforementioned problem will be described with reference to the accompanying drawing.

Figure 11:
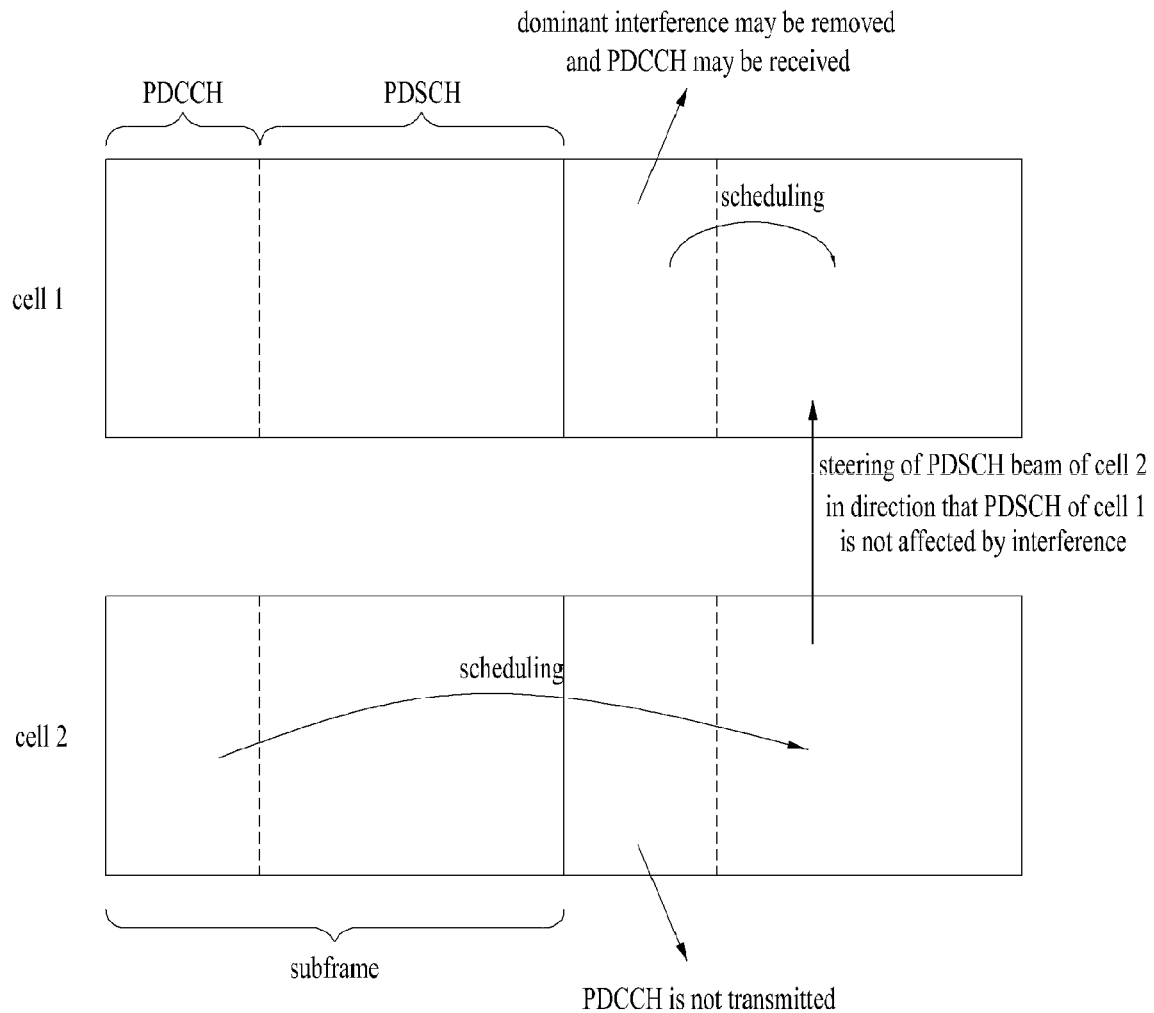
FIG. 11 is a diagram illustrating a method for mitigating inter cell interference according to the embodiment of the present invention.

FIG. 11 is a diagram illustrating a method for mitigating inter cell interference according to the embodiment of the present invention.

Referring to FIG. 11, the interference cell may transmit a PDCCH corresponding to a PDSCH transmitted for a specific subframe, for one of previous subframes not the subframe for which the corresponding PDSCH is transmitted. In other words, the interference cell may schedule the PDSCH of the subframe n through a PDCCH of a subframe (n-m) (m>0), and may not transmit any signal through a resource for PDCCH for the subframe n or may not transmit some signal (for example, PDCCH signal corresponding to the PDSCH). For this reason, the victim user equipment may receive the PDCCH of the serving cell without interference. According to this method, since PDSCHs of several subframes may be scheduled by the PDCCH of one subframe, the operation suggested in this method will be referred to as "multi-subframe scheduling" or "inter-subframe scheduling".

Hereinafter, a communication scheme required for a correct operation of multi-sbuframe scheduling will be suggested in more detail.

Method for Indicating Subframe

For multi-subframe scheduling, a field indicating PDSCH/PUSCH of a corresponding subframe to which a corresponding PDCCH corresponds will be required. For convenience, information indicating a subframe corresponding to the PDCCH in multi-subframe scheduling will be referred to as a subframe indicator or a resource indicator. The subframe indicator may newly be defined within the DCI or may be defined/indicated using a part of the existing DCI. Similarly, the subframe indicator may be transmitted through a field (for convenience, subframe indication field or resource indication field) newly defined within the DCI, or may be transmitted using a part of the existing DCI field. For example, the subframe indicator may be transmitted using a field (for example, CIF field) defined for cross-carrier scheduling. In this case, a DCI format of the PDCCH, which is used for multi-subframe scheduling, may be designed to have the same structure as that of the DCI format of the PDCCH for cross-carrier scheduling. In other words, a carrier indicator for cross-carrier scheduling may be used as the subframe indicator depending on the status. In order to assist understanding of the present invention, the carrier indicator may be used to refer to the subframe indicator, and the carrier indicator and the subframe indicator may be interpreted to indicate carrier or subframe.

If the same DCI format is used for multi-subframe scheduling and cross-carrier scheduling, a problem as to how to interpret the CIF field may occur. To this end, the present invention suggests that a specific user equipment interprets a value of a CIF field as a subframe indicator indicating PDSCH/PUSCH of a subframe scheduled by the corresponding PDCCH if the specific user equipment receives the CIF field in a state that the specific user equipment is configured to use one CC. For example, if the subframe indicator included in the PDCCH of the subframe n indicates m, it may be interpreted that the corresponding PDCCH schedules a PDSCH of a subframe (n+m) or a PUSCH of a subframe (n+k+m). In this case, k is a value indicating transmission timing between a PUSCH and a PDCCH (UL grant), which are defined in the 3GPP LTE system. In the FDD system, k=4, and in the TDD system, k depends on UL/DL subframe configuration.

Table 2 illustrates uplink-downlink configuration in a TDD system of the 3GPP LTE, and Table 3 illustrates a difference k in transmission timing between the PDCCH and the PUSCH according to TDD UL/DL configuration.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In this case, D represents a DL subframe, U represents a UL subframe, and S represents a special subframe.

TABLE 3

| TDD UL/DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 |   | 4 | 6 |   |   |   | 4 | 6 |   |   |
| 1 |   |   | 6 |   | 4 |   |   | 6 |   | 4 |
| 2 |   |   |   |   | 4 |   |   |   |   | 4 |
| 3 | 4 |   |   |   |   |   |   |   | 4 | 4 |
| 4 |   |   |   |   |   |   |   |   | 4 | 4 |
| 5 |   |   |   |   |   |   |   |   | 4 |   |
| 6 |   | 7 | 7 |   |   |   |   | 7 | 7 | 5 |

For the aforementioned operation, the base station may configure the number of bits of the carrier (or subframe) indicator of the PDCCH transmitted to the corresponding user equipment through an higher layer signal such as radio resource control (RRC) signal. Alternatively, the base station may notify the user equipment of the range (or maximum value) of the value of m through the higher layer signal such as RRC. In other words, the base station may semi-statically configure the range (or maximum value) of multi-subframe scheduling applied to the corresponding user equipment or the range (or maximum value) of a subframe that may be scheduled for a specific subframe. Through this configuration, the user equipment may simply perform blind decoding for the PDCCH by means of one assumption of the number of bits of the carrier (or subframe) indicator.

Although scheduling of the PDSCH existing for one subframe through one PDCCH has been described as above, the scope of the present invention is not limited to this case. As a modified example of the present invention, if the carrier (or subframe) indicator indicates a specific status, PDSCH existing for one or more subframes may be scheduled through the corresponding PDCCH. For example, it is assumed that 2 bits are allocated to the carrier (or subframe) indicator and the PDCCH is transmitted for the subframe n. In this case, if the indicator is 00, it may be interpreted that the PDSCH of the subframe n is scheduled. If the indicator is 01, it may be interpreted that the PDSCH of the subframe n+1 is scheduled. If the indicator is 11, it may be interpreted that the PDSCHs of the subframe n and the subframe n+1 are scheduled. The subframe indicator included in the PDCCH of the subframe n may include a bitmap indicating a subframe having actual downlink resource allocation among subframes (for example, subframe n, n+1, . . . ) for which the PDSCH may be scheduled. If one PDCCH schedules PDSCHs of two or more subframes, resource allocation on each PDSCH, modulation and coding scheme (MCS) level, transmission rank and/or precoding information may independently be transmitted to the corresponding PDCCH. Alternatively, all or some of the scheduling information may equally be applied to the PDSCHs of all the subframes.

Since DL subframe and UL subframe occur alternately in the TDD system, if the value of the carrier (or subframe) indicator is set to m, it may be interpreted that the PDCCH of the subframe n schedules the PDSCH of the mth DL subframe after the subframe n or the PUSCH of the mth UL subframe after the subframe (n+k).

Figure 12:
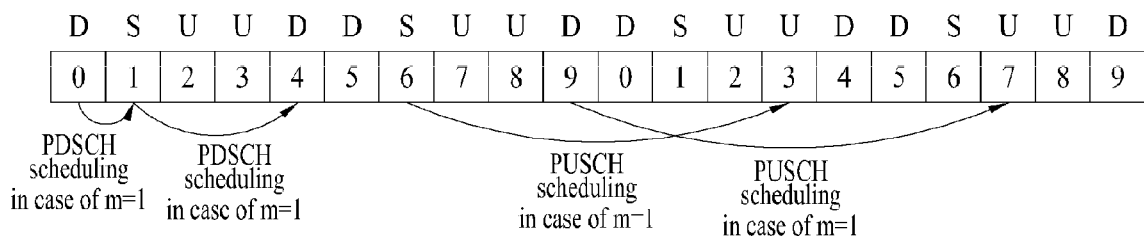
FIG. 12 is a diagram illustrating a method for scheduling a PDSCH by controlling a carrier (or subframe) indicator value in case of TDD UL/DL configuration 1.

FIG. 12 is a diagram illustrating a method for scheduling a PDSCH by controlling a carrier (or subframe) indicator value in case of TDD UL/DL configuration 1. In the drawing, D represents a DL subframe, U represents a UL subframe, and S represents a special subframe.

Referring to FIG. 12, PDSCH scheduling set to m=1 at subframe 0 means PDSCH scheduling of subframe 1 which is the subframe for which next PDSCH may be transmitted. PDSCH scheduling set to m=1 at subframe 1 means scheduling of subframe 4 which is the first DL subframe for which next PDSCH may be transmitted. In the meantime, PUSCH scheduling set to m=1 at subframe 6 means PUSCH scheduling of subframe 3 which is the first UL subframe after subframe 2 which is the PUSCH transmission subframe according to Table 3. Similarly, PUSCH scheduling set to m=1 at subframe 9 means PUSCH scheduling of subframe 7 which is the first UL subframe after subframe 3 which is the PUSCH transmission subframe according to Table 3.

Method for Determining PDSCH Start Timing Point

In the existing 3GPP LTE system, the user equipment first reads PCFICH and identifies whether the read PDCCH reserves how many OFDM symbols of the corresponding subframe and then receives PDSCH on the assumption that the PDSCH is transmitted from next OFDM symbol corresponding to the time when transmission of PDCCH ends. However, if multi-subframe scheduling is used, since subframes which the PDCCH and the PDSCH are transmitted are varied, a PDSCH start timing point (that is, start OFDM symbol) of the subframe n+m (m>0) scheduled through the PDCCH of the subframe n cannot be identified by the existing system. Accordingly, a separate operation indicating a start timing point of the PDSCH will be required if multi-subframe scheduling is used.

According to one method, if multi-subframe scheduling is performed, a method for configuring a start timing point of a PDSCH as an higher layer signal such as RRC may be used. This method is advantageous in that the start timing point of the PDSCH may be notified stably and the method used in cross-carrier scheduling between CCs may be reused. To this end, cell 1 and cell 2 in FIG. 10, for example, may exchange information on a start timing point of a PDSCH, which will be used by the cell 2 for subframes for multi-subframe scheduling, with each other through backhaul signaling between them.

According to another method, a start timing point of the PDSCH at the subframe n+m may be determined by PCFICH of the subframe n for which the corresponding PDSCH is scheduled. In other words, the user equipment may read the PCFICH for the subframe n and identify the location of the OFDM symbol corresponding to the time when transmission of the PDCCH ends, and may assume that the PDSCH for the subframe n+m is transmitted from next symbol of the OFDM symbol identified by the PCFICH of the subframe n. This method is advantageous in that the PCFICH of the subframe n is controlled to indirectly control a PDSCH start timing point of the subframe n+m dynamically.

According to other method, the PCFICH may be transmitted even for the subframe n+m, and the user equipment may calculate the PDSCH start timing point for the subframe n+m on the basis of the transmission of the PCFICH. Referring to FIG. 10, this method is not advantageous in that some interference is caused due to transmission of the PCFICH from the interference cell 2 even for the subframe n+m. However, since the PCFICH reserves a small quantity of resources relatively as compared with the PDCCH, this method is advantageous in that interference is maintained at low level and the PDSCH start timing point of the corresponding subframe may be controlled directly and dynamically.

Method for Transmitting UL ACK/NACK

In case of the existing 3GPP LTE system, UL ACK/NACK for the decoding result of the PDSCH transmitted for DL subframe n is transmitted for UL subframe n+k. In the FDD system, k=4, and in the TDD system, k is as illustrated in Table 4. Also, the location of the PUCCH resource to which ACK/NACK will be transmitted is determined from CCE index of the PDCCH that has scheduled the corresponding PDSCH as described with reference to FIG. 5 and Equation 1. However, since the PDCCH and the PDSCH are not transmitted for the same subframe in multi-subframe scheduling, a problem may occur if the location of the PUCCH resource and subframe for which UL ACK/NACK will be transmitted is determined in the same manner as the existing method. For example, if the location of the PUCCH resource and subframe for which UL ACK/NACK will be transmitted is determined on the basis of PDCCH (DL grant) transmission, a problem may occur in that the user equipment does not have enough time to decode the PDSCH or the PUCCH resource may collide with PUCCH resource of another PDSCH. Hereinafter, methods for solving the problem will be suggested.

Table 4 illustrates a difference k in transmission timing between PDCCH/PDSCH and UL ACK/NACK in the TDD system of the 3GPP LTE.

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | 7 | 6 | | 4 | 7 | 6 | | | 4 |
| 2 | | 7 | 6 | 4 | 8 | 7 | 6 | | 4 | 8 |
| 3 | 4 | 11 | | | | 7 | 6 | 6 | 5 | 5 |
| 4 | 12 | 11 | | 8 | 7 | 7 | 6 | 5 | 4 | |
| 5 | 12 | 11 | 9 | 8 | 7 | 6 | 5 | 4 | 13 | |
| 6 | 7 | 7 | | | | 7 | 7 | | | 5 |

1) Method for determining UL ACK/NACK resource
A) Semi-static configuration method In this method, a method for determining ACK/NACK for multi-subframe scheduling semi-statically through an higher layer (for example, RRC) signal will be suggested. In other words, if the user equipment receives scheduling for the PDSCH received for the subframe n through a PDCCH of subframe n-m (m>0), it transmits UL ACK/NACK by using a PUCCH resource given through a separate higher layer signal not the PUCCH resource linked to CCE index of the PDCCH. This method is advantageous in that there is no collision of PUCCH resources even though CCE(s) of the PDCCH used for multi-subframe scheduling for the subframe n-m is reused to transmit the PDCCH for the subframe n.

B) Method for Using PUCCH Resource Linked to PDCCH CCE Index

In this method, a method for using PUCCH resource linked CCE index of a PDCCH during multi-subframe scheduling in the same manner as the existing method will be suggested. In this method, since a separate ACK/NACK resource is not reserved unlike the above method 1-A, it is advantageous in that the ACK/NACK resource may be used more effectively. Instead, in this method, an operation for avoiding collision of PUCCH resources will be required. For example, if the PDSCH of the subframe n is scheduled using the PDCCH of the subframe n-m, it may be limited such that CCE(s) index of the corresponding PDCCH may not be used for the subframe n. Moreover, the subframe n may be set as the subframe for which the PDCCH is not transmitted.

2) Method for Determining UL ACK/NACK Transmission Subframe

A) Method for Maintaining Transmission Timing of the Existing PDCCH and UL ACK/NACK In this method, UL ACK/NACK is transmitted for the subframe n+k as defined in the existing 3GPP LTE even though the PDCCH transmitted for the subframe n schedules the PDSCH of the subframe n+m (m>0) (for example, in the FDD system, k=4, and in the TDD system, k is as illustrated in Table 4).

In this case, since the time between PDSCH reception and UL ACK/NACK transmission becomes short in view of the user equipment, a problem may occur in that the sufficient time to decode the PDSCH may not be obtained. For example, in the FDD system of the 3GPP LTE, the user equipment receives the PDCCH and the PDSCH for the same subframe, decodes the PDSCH for 3 ms after receiving the PDSCH, and transmits the decoded result for the subframe corresponding to 4 ms after receiving the PDSCH. However, in the multi-subframe scheduling status, the user equipment receives the PDCCH, and receives the PDSCH after m subframe, the time for decoding the PDSCH is reduced to (k−m−1) ms.

In order to solve the aforementioned problem, asynchronous HARQ operation of the downlink may be used. For example, if the user equipment fails to sufficiently decode the PDSCH received through multi-subframe scheduling, it transmits NACK signal for the subframe defined in the 3GPP LTE. Alternatively, in order to reduce battery consumption of the user equipment, if decoding time does not reach 3 ms, it may be ruled such that the user equipment cannot transmit UL ACK/NACK. The base station may perform retransmission of the PDSCH by using the same HARQ process ID after time passes (in this case, retransmission may be performed by multi-subframe scheduling or the existing scheduling). The user equipment may notify the base station of the received result by reporting the decoding result of initial transmission and retransmission at the time when it transmits ACK/NACK for retransmission. In particular, if the base station does not allocate any resource to the actual PDSCH from the PDCCH that schedules retransmission (this may be referred to as dummy DL allocation or dummy PDCCH), it may be interpreted as a message requesting UL ACK/NACK only for initial transmission based on multi-subframe scheduling without additional PDSCH retransmission.

Figure 13:
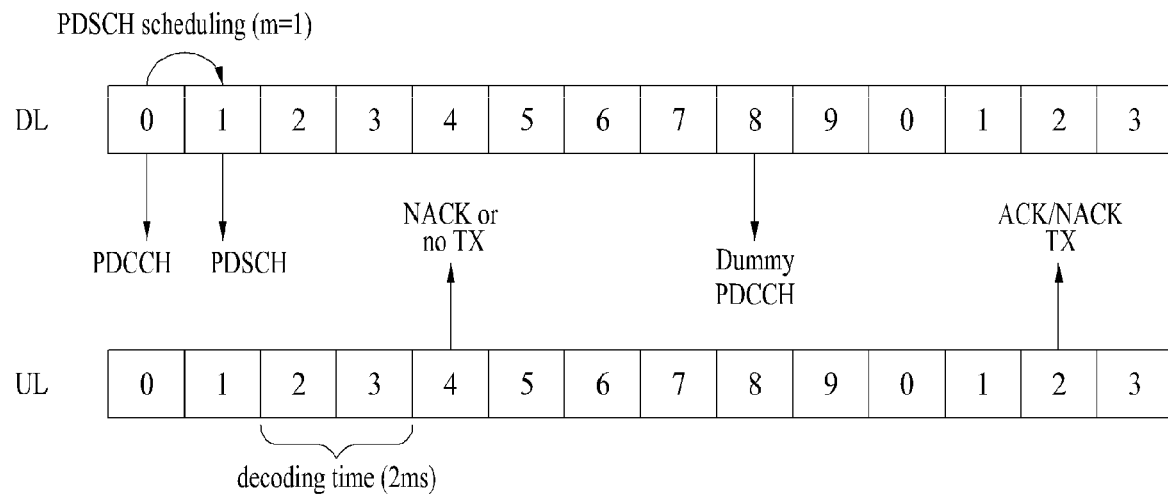
FIG. 13 is a diagram illustrating an example of a reporting operation of ACK/NACK for multi-subframe scheduling through dummy DL allocation in an FDD system.

FIG. 13 is a diagram illustrating an example of a reporting operation of ACK/NACK for multi-subframe scheduling through dummy DL allocation in an FDD system.

Referring to FIG. 13, the base station performs multi-subframe scheduling for the PDSCH by setting m=1 for DL subframe 0. Although the corresponding PDSCH is transmitted for DL subframe 1, since the user equipment should transmit ACK/NACK for UL subframe 4, the decoding time becomes 2 ms. Accordingly, since the user equipment fails to decode the PDSCH for subframe 4, it transmits NACK, or determines that the decoding time is not sufficient and does not transmit any ACK/NACK. The base station again transmits dummy PDCCH for subframe 8, and the user equipment that has received the dummy PDCCH reports the decoding result of the PDSCH for subframe 2 of next radio frame by using PUCCH resource corresponding to CCE index of the dummy PDCCH.

B) Method for Determining UL ACK/NACK Transmission Timing to Assure Decoding Time of PDSCH In this method, if the PDCCH transmitted for the subframe n schedules the PDSCH of subframe n+m (m>0), UL ACK/NACK may be transmitted for subframe n+k'. In this case, k' is set to assure the time for decoding the PDSCH. Supposing that 3 ms is required for PDSCH decoding, the subframe n+k' may be set to be the first UL subframe after subframe n+m+3. As another method, k'=m+k may be determined, wherein k may mean a parameter indicating timing difference between the subframe (that is, subframe n+m) for which the PDSCH is transmitted and the subframe for which UL ACK/NACK for the PDSCH is transmitted. This method may be interpreted that UL ACK/NACK transmission timing is selected by the PDSCH transmission timing not the PDCCH transmission timing if multi-subframe scheduling is performed. In the FDD system, k'=m+4 may be fixed. It is assumed that the UL ACK/NACK transmission timing is determined to assure the decoding time of the PDSCH in accordance with the aforementioned methods. In this case, if ACK/NACK is transmitted using the PUCCH resource linked to CCE index of the PDCCH as described in 2)-B, it is characterized in that ACK/NACK transmission timing is determined by the transmission timing (subframe n+m) of the PDSCH but the PUCCH resource is determined by the transmission timing (subframe n) of the PDCCH.

In some TDD UL/DL subframe configuration, the second DL subframe may exist between the PDCCH and the UL ACK/NACK subframe, and the sufficient decoding time may exist between the second DL subframe and the UL ACK/NACK subframe. For example, in case of UL/DL configuration 1 of m=0, ACK/NACK for the PDSCH transmitted for DL subframe 0 is transmitted for UL subframe 7 after seven subframes, and at the same time ACK/NACK for the PDSCH transmitted for subframe 1 is transmitted for UL subframe 7 after six subframes. Accordingly, even though the base station sets the subframe indicator to m=1 for subframe 0 and schedules PDSCH transmission of subframe 1, the sufficient decoding time exists for subframe 7 for UL ACK/NACK transmission of subframe 0, and there is no problem in ACK/NACK transmission for subframe 7 by using the PUCCH resource linked to the PDCCH transmitted for subframe 0. In this case, the subframe for which UL ACK/NACK is transmitted becomes the same as UL ACK/NACK subframe of the 3GPP LTE, which is linked to the PDCCH (that is, k'=k). For convenience, in case of the TDD system, multi-subframe scheduling may be limited to subframe of Table 5 of k'=k (that is, the PDSCH of the subframe n+m is scheduled for the subframe n and UL ACK/NACK is transmitted for the subframe n+k by using k illustrated in Table 4).

Table 5 illustrates a set of values of m that may assure decoding time of the PDSCH based on multi-subframe scheduling during ACK/NACK feedback.

TABLE 5

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 0 | | | | | 0 | 0 | | | |
| 1 | 0, 1 | 0 | | | 0 | 0, 1 | 0 | | | 0 |
| 2 | 0, 1, 2 | 0, 1 | | 0 | 0, 1, 2, 3 | 0, 1, 2 | 0, 1 | | 0 | 0, 1, 2, 3 |
| 3 | 0 | 0, 1, 2, 3, 4 | | | | 0, 1, 2, 3 | 0, 1, 2 | 0, 1, 2 | 0, 1 | 0, 1 |
| 4 | 0, 1, 2, 3, 4, 5, 6 | 0, 1, 2, 3, 4, 5 | | | 0, 1, 2, 3, 4 | 0, 1, 2, 3 | 0, 1, 2, 3 | 0, 1, 2 | 0, 1 | 0 |
| 5 | 0, 1, 2, 3, 4, 5, 6, 7 | 0, 1, 2, 3, 4, 5, 6 | | 0, 1, 2, 3, 4, 5 | 0, 1, 2, 3, 4 | 0, 1, 2, 3 | 0, 1, 2 | 0, 1 | 0 | 0, 1, 2, 3, 4, 5, 6, 7, 8 |
| 6 | 0, 1 | 0 | | | | 0, 1 | 0 | | | 0 |

Additionally, DL subframes applied to multi-subframe scheduling in the TDD system may be limited to DL subframes that transmit UL ACK/NACK for the same UL subframe in accordance with UL ACK/NACK transmission rule (that is, Table 4) of the 3GPP LTE.

Also, multi-subframe scheduling may be limited to the subframes of k'=k as illustrated in Table 6 below in the same manner as the aforementioned description. Table 6 illustrates a set of values of m that may assure decoding time of the PDSCH based on multi-subframe scheduling for DL subframe index (case where DL subframes to which multi-subframe scheduling is applied in the TDD system are limited to DL subframes that transmit UL ACK/NACK for the same UL subframe in accordance with UL ACK/NACK transmission rule of the 3GPP LTE).

TABLE 6

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 0 | 0 | | | | 0 | 0 | | | |
| 1 | 0, 1 | 0 | | | 0 | 0, 1 | 0 | | | 0 |
| 2 | 0, 1, 2 | 0, 1 | | 0 | 0, 1, 2, 3 | 0, 1, 2 | 0, 1 | | 0 | 0, 1, 2, 3 |
| 3 | 0 | 0, 1, 2 | | | | 0, 1 | 0 | 0, 1 | 0 | 0, 1 |
| 4 | 0, 1, 2, 3 | 0, 1, 2 | | | 0, 1 | 0 | 0, 1, 2, 3 | 0, 1, 2 | 0, 1 | 0 |
| 5 | 0, 1, 2, 3, 4, 5, 6, 7 | 0, 1, 2, 3, 4, 5, 6 | 0, 1, 2, 3, 4, 5 | 0, 1, 2, 3, 4 | 0, 1, 2, 3 | 0, 1, 2 | 0, 1 | 0 | | 0, 1, 2, 3, 4, 5, 6, 7, 8 |
| 6 | 0 | 0 | | | | 0 | 0 | | | 0 |

Multi-Subframe Scheduling Method in Carrier Aggregation Status

The method for performing multi-subframe scheduling in a single carrier status has been described as above. The aforementioned methods may similarly be applied to a multi-carrier status. The operation of multi-subframe scheduling in a carrier aggregation status becomes the scheduling operation of different subframes of different CCs for a specific subframe of a specific CC in view of the base station. In other words, cross scheduling is performed for CC, subframe, and two-dimensional resources. Accordingly, a cross-scheduling indicator for two-dimensional resources will be required for the PDCCH that schedules PDSCH/PUSCH.

First of all, a method for performing multi-subframe scheduling in a carrier aggregation status by using a resource indicator extended from the carrier indicator or subframe indicator will be described. In this method, the carrier indicator and the subframe indicator are joint-encoded to one resource indicator (or resource indication field). Accordingly, both cross-scheduling and multi-subframe scheduling may be performed using one resource indicator. To this end, the base station may semi-statically set the number $N_R$ of bits of the resource indicator through an higher layer (for example, RRC) signal and notify a specific user equipment of the number $N_{CC}$ of CCs, which are configured. Since the number of total states of the resource indicator expressed as $N_R$ bits is $2^{(N_R)}$, if the number of total states is greater than $N_{CC}$, the remaining state may be used for subframe indication. In more detail, if the total states are indexed as 0, 1, ..., $2^{(N_R)}-1$, states 0, 1, ..., $N_{CC}-1$ may respectively be interpreted as scheduling for CC 0, 1, ..., $N_{CC}-1$ at m=0, and states $N_{CC}$, $N_{CC}+1$, ..., $2N_{CC}-1$ may respectively be interpreted as scheduling for CC 0, 1, ..., $N_{CC}-1$ at m=1. This interpretation operation may be performed repeatedly, whereby multi-subframe scheduling may be performed to reach m=floor$\{2^{(N_R)}\}/N_{CC}\}-1$. In this case, floor{x} means a maximum integer smaller than or equal to x.

Figure 14:
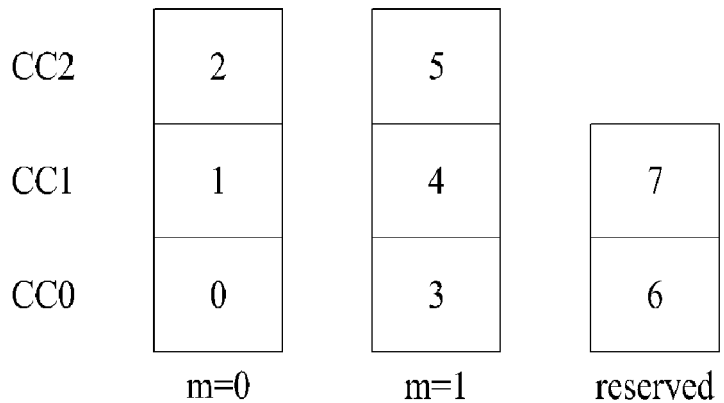
FIG. 14 is a diagram illustrating a multi-subframe scheduling method in a multi-carrier status.

FIG. 14 is a diagram illustrating a multi-subframe scheduling method in a multi-carrier status. In more detail, FIG. 14 illustrates a subframe of CC scheduled by each state of a resource indicator (or resource indication field) if $N_R=3$ and $N_{CC}=3$.

Referring to FIG. 14, the resource indicator includes three bits ($N_R=3$), it may indicate a total of eight states. Since the number of CCs which are configured is 3 ($N_{CC}=3$), five remaining states may be used for multi-subframe scheduling. For example, as shown, states 0, 1, 2 may be interpreted as scheduling for CC 0, 1, 2 at m=0, and states 3, 4, 5 may be interpreted as scheduling for CC 0, 1, 2 at m=1. Multi-subframe scheduling (for example, m=2) for all the three CCs cannot be performed by states 6 and 7, and the states 6 and 7 are reserved in the drawing. However, unlike FIG. 14, the states 6 and 7 may be used as scheduling indicators corresponding to m=2 at CC0 and CC1, respectively.

As another method, in a state that the carrier indicator and the subframe indicator may exist independently, resource allocation for multi-subframe scheduling may be performed.

Figure 15:
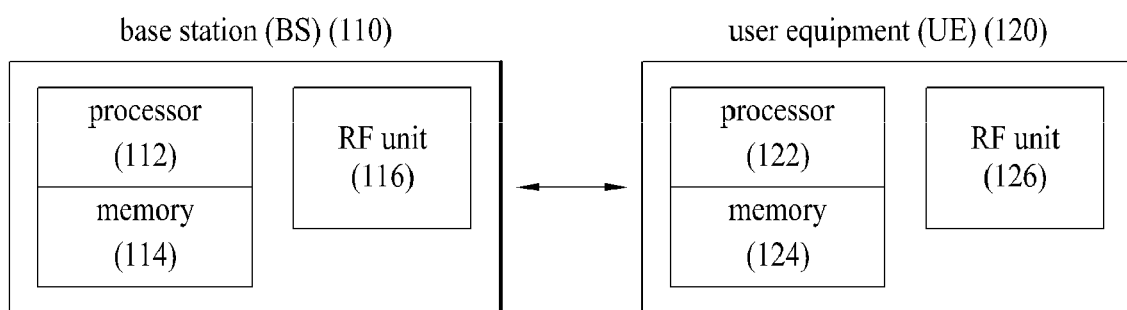
FIG. 15 is a diagram illustrating a base station and a user equipment, which can be applied to the embodiment of the present invention.

FIG. 15 is a diagram illustrating a base station and a user equipment, which may be applied to one embodiment of the present invention. If a relay is included in a wireless communication system, communication in a backhaul link is performed between the base station and the relay and communication in an access link is performed between the relay and the user equipment. Accordingly, the base station or the user equipment as shown may be replaced with the relay depending on the circumstances.

Referring to FIG. 15, the wireless communication system includes a base station (BS) 110 and a user equipment (UE) 120. The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention may be used for a wireless communication device such as a user equipment, a relay and a base station.

The invention claimed is:

1. A method for receiving a downlink signal by a user equipment (UE) in a wireless communication, the method comprising:
receiving a Radio Resource Control (RRC) message including time resource allocation information for Physical Downlink Shared Channel (PDSCH) signals;
receiving a Physical Downlink Control Channel (PDCCH) including downlink control information (DCI) in a first time resource n;
receiving a PDSCH, corresponding to the PDCCH, in a second time resource n+m after the first time resource, in accordance with the DCI and the time resource allocation information received through the RRC message; and
decoding the PDSCH signal,
wherein the time resource allocation information received through the RRC message includes both one or more time resource offset information and PDSCH starting point information,
wherein the UE identifies the second time resource n+m based on one of the one or more time resource offset information, as indicated by a value in a time resource indication field in the DCI, and
wherein the UE determines a starting Orthogonal Frequency-Division Multiplexing (OFDM) symbol of the PDSCH in the second time resource n+m based on the PDSCH starting point information included in the RRC message.

2. The method according to claim 1,
wherein the one time resource offset information of the one or more time resource offset information establishes that the second time resource n+m is offset from the first time resource n by m time resources.

3. The method according to claim 1, wherein the one time resource offset information of the one or more time resource offset information, as indicated by the time resource indication field, indicates the second time resource n+m, in which the PDSCH is actually located, among a plurality of time resources in which the PDSCH can be located.

4. The method according to claim 3, further comprising:
receiving, through the RRC message, information identifying the plurality of time resources in which the PDSCH can be located.

5. The method according to claim 1, wherein the time resource indication field comprises a number of bits which is determined through the RRC message.

6. The method according to claim 1, wherein determining the starting OFDM symbol of the PDSCH in the second time resource n+m based on the starting point information included in the RRC message comprises:
determining the starting OFDM symbol from among a plurality of OFDM symbols in the second time resource n+m.

7. The method according to claim 1 further comprising:
transmitting, through a physical uplink control channel (PUCCH) signal on a third time resource, acknowledgement (ACK)/negative-ACK (NACK) according to a result of decoding the PDSCH signal, wherein the third time resource is determined based on the second time resource n+m.

8. The method according to claim 7, wherein the ACK/NACK transmission is an asynchronous hybrid automatic repeat request (HARQ) operation.

9. A method of transmitting a downlink signal by a base station (BS), the method comprising:
transmitting a Radio Resource Control (RRC) message including time resource allocation information for Physical Downlink Shared Channel (PDSCH) signals;
transmitting a physical downlink control channel (PDCCH) including downlink control information (DCI) in a first time resource n; and
transmitting a PDSCH, corresponding to the PDCCH, in a second time resource n+m after the first time resource, in accordance with the DCI and the time resource allocation information,
wherein the time resource allocation information transmitted through the RRC message includes both one or more time resource offset information and PDSCH starting point information,
wherein one of the one or more time resource offset information, as indicated by a value in a time resource indication field in the DCI, identifies a location of the second time resource n+m, and wherein the PDSCH starting point information included in the RRC message indicates a starting Orthogonal Frequency-Division Multiplexing (OFDM) symbol of the PDSCH in the second time resource n+m.

10. The method according to claim 9, wherein the one time resource offset information of the one or more time resource offset information establishes that the second time resource n+m is offset from the first time resource n by m time resources.

11. The method according to claim 9, wherein the one time resource offset information of the one or more time resource offset information, as indicated by the time resource indication field, indicates the second time resource n+m, in which the PDSCH is actually located, among a plurality of time resources in which the PDSCH can be located.

12. The method according to claim 11 further comprising:

transmitting, through the RRC message, information identifying the plurality of time resources in which the PDSCH can be located.

13. The method according to claim 9, wherein the time resource indication field comprises a number of bits which is determined through the RRC message.

14. The method according to claim 9, wherein the starting OFDM symbol of the PDSCH in the second time resource n+m is one of a plurality of OFDM symbols in the second time resource n+m.

15. The method according to claim 9, further comprising:

receiving, through a physical uplink control channel (PUCCH) signal on a third time resource, acknowledgement (ACK)/negative-ACK (NACK) for the PDSCH, wherein the third time resource is determined based on the second time resource n+m.

16. The method according to claim 15, wherein the ACK/NACK reception is an asynchronous hybrid automatic repeat request (HARQ) operation.

17. A user equipment (UE) comprising:

a receiver; and a processor, operationally connected to the receiver, configured to:

control the receiver to receive a Radio Resource Control (RRC) message including time resource allocation information for Physical Downlink Shared Channel (PDSCH) signals; a Physical Downlink Control Channel (PDCCH) including downlink control information (DCI) in a first time resource n; and a PDSCH, corresponding to the PDCCH, in a second time resource n+m after the first time resource, in accordance with the DCI and the time resource allocation information received through the RRC message; and decode the PDSCH signal, wherein the time resource allocation information received through the RRC message includes both one or more time resource offset information and PDSCH starting point information, and wherein the processor is further configured to identify the second time resource n+m based on one of the one or more time resource offset information, as indicated by a value in a time resource indication field in the DCI, and determine a starting Orthogonal Frequency-Division Multiplexing (OFDM) symbol of the PDSCH in the second time resource n+m based on the PDSCH starting point information included in the RRC message.

18. A base station (BS) comprising:

a transmitter; and a processor, operationally connected to the transmitter, configured to:

control the transmitter to transmit a Radio Resource Control (RRC) message including time resource allocation information for Physical Downlink Shared Channel (PDSCH) signals; a physical downlink control channel (PDCCH) including downlink control information (DCI) in a first time resource n; and a PDSCH, corresponding to the PDCCH, in a second time resource n+m after the first time resource, in accordance with the DCI and the time resource allocation information, wherein the time resource allocation information transmitted through the RRC message includes both one or more time resource offset information and PDSCH starting point information, wherein one of the one or more time resource offset information, as indicated by a value in a time resource indication field in the DCI, identifies a location of the second time resource n+m, and wherein the PDSCH starting point information included in the RRC message indicates a starting Orthogonal Frequency-Division Multiplexing (OFDM) symbol of the PDSCH in the second time resource n+m.

* * * * *